United States Patent
Ito et al.

(10) Patent No.: US 7,585,802 B2
(45) Date of Patent: Sep. 8, 2009

(54) METHOD OF PRODUCING A DIELECTRIC CERAMIC COMPOSITION

(75) Inventors: Kazushige Ito, Yokohama (JP); Akira Sato, Inbagan (JP); Akitoshi Yoshii, Akita-ken (JP); Masayuki Okabe, Nikaho (JP); Atsushi Takeda, Akita (JP); Takaki Shinkawa, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/292,042

(22) Filed: Nov. 10, 2008

(65) Prior Publication Data

US 2009/0082192 A1 Mar. 26, 2009

Related U.S. Application Data

(63) Continuation of application No. 11/604,741, filed on Nov. 28, 2006, now abandoned.

(30) Foreign Application Priority Data

Nov. 30, 2005 (JP) ............................. 2005-346881

(51) Int. Cl.
*C04B 35/468* (2006.01)
(52) U.S. Cl. ...................... 501/139; 264/615
(58) Field of Classification Search ................. 501/139; 264/615
See application file for complete search history.

(56) References Cited

U.S. PATENT DOCUMENTS

| | | | |
|---|---|---|---|
| 3,544,916 A | 12/1970 | Angelbeck | |
| 6,243,254 B1 | 6/2001 | Wada et al. | |
| 6,645,895 B2 | 11/2003 | Sato et al. | |
| 6,800,270 B2 | 10/2004 | Nomura et al. | |
| 7,271,115 B2 | 9/2007 | Suzuki | |
| 7,297,403 B2 | 11/2007 | Ito et al. | |
| 2001/0039238 A1 | 11/2001 | Sato et al. | |
| 2003/0007315 A1 | 1/2003 | Morita et al. | |
| 2004/0169967 A1 | 9/2004 | Konaka et al. | |
| 2006/0116273 A1 | 6/2006 | Ito et al. | |
| 2006/0128553 A1 | 6/2006 | Yanagida et al. | |
| 2007/0149382 A1* | 6/2007 | Ito et al. | 501/137 |

FOREIGN PATENT DOCUMENTS

| | | |
|---|---|---|
| EP | 1 583 114 A1 | 10/2005 |
| JP | A-2000-311828 | 11/2000 |
| JP | A-2002-060268 | 2/2002 |
| JP | 2002-080276 A | 3/2002 |
| JP | 2004-214539 A | 7/2004 |

* cited by examiner

*Primary Examiner*—Karl E Group
(74) *Attorney, Agent, or Firm*—Oliff & Berridge, PLC

(57) ABSTRACT

A dielectric ceramic composition comprised of at least dielectric particles having barium titanate as its main ingredient, wherein the ratio of dielectric particles having a surface diffusion structure comprised of a main ingredient phase comprised of the main ingredient and a diffusion phase present around the main ingredient phase with respect to said dielectric particles is 60% or more and the ratio of dielectric particles having a domain in the main ingredient phase with respect to the dielectric particles having the surface diffusion structure is 20% or less. According to the present invention, a dielectric ceramic composition and electronic device realizing good high temperature accelerated life can be provided.

4 Claims, 4 Drawing Sheets

(A)

(B)

METHOD OF PRODUCING A DIELECTRIC CERAMIC COMPOSITION

This is a Continuation of application Ser. No. 11/604,741 filed Nov. 28, 2006, now abandoned, which in turn claims priority of Japanese Patent Application No. 2005-346881 filed Nov. 30, 2005. The disclosure of the prior application is hereby incorporated by reference herein in its entirety.

BACKGROUND OF THE INVENTION

1. Field of the Invention

The present invention relates to a dielectric ceramic composition, electronic device, and multilayer ceramic capacitor, more specifically relates to a dielectric ceramic composition making the ratio of the dielectric particles having a surface diffusion structure comprised of a main ingredient phase and a diffusion phase and of the dielectric particles having a domain in the main ingredient phase among dielectric particles forming the dielectric ceramic composition a certain range so as to realize a high temperature accelerated life, capacity-temperature characteristic, and dielectric constant which are all excellent.

2. Description of the Related Art

In recent years, electronic apparatuses have been rapidly made smaller in size and higher in performance. The electronic devices mounted in these electronic apparatuses are therefore also being required to be made smaller in size and higher in performance. As the characteristics required from multilayer ceramic capacitors, one example of an electronic device, a high dielectric constant, a long insulation resistance (IR) life, a good DC bias characteristic, and also a good temperature characteristic etc. may be mentioned.

Further, multilayer ceramic capacitors are being used not only in general electronic apparatuses, but also in engine electronic control units (ECU), crank angle sensors, antilock braking system (ABS) modules, or other various types of electronic apparatuses mounted in automobile engine compartments.

The environment in which, these electronic apparatuses are used falls in the winter in cold regions to as low as −20° C. or less. Further, after engine startup, in the summer, the temperature can be expected to rise to +130° C. or more. Recently, further, the wire harnesses connecting such electronic apparatuses and the equipment they control have been slashed and the electronic apparatuses have even been set outside the vehicles, so the environment of these electronic apparatuses has become even harsher. Therefore, the capacitors used in these electronic apparatuses are required to have flat temperature characteristics in a broad temperature range. Specifically, a dielectric ceramic composition must satisfy not only the X7R characteristic of the EIA standard (−55 to 125° C., $\Delta C/C=\pm15\%$ or less), but also the X8R characteristic of the EIA standard (−55 to 150° C., $\Delta C/C=\pm15\%$ or less).

As dielectric ceramic compositions satisfying the X8R characteristic, various proposals have been made. For example, Japanese Patent Publication (A) No. 2004-214539 discloses to calculate the average value of the concentration of Ca in the crystal particles and make its range of dispersion 5% or more in terms of CV value so as to obtain a capacitor satisfying the X8R characteristic and exhibiting an excellent CR product and high temperature accelerated life.

On the other hand, to realize a good dielectric constant and a good temperature characteristic, it is considered effective to make the dielectric particles forming a dielectric ceramic composition having $BaTiO_3$ as a main ingredient a core-shell structure.

For example, Japanese Patent Publication (A) 2002-80276 discloses a dielectric ceramic composition characterized in that ceramic particles having a core-shell structure account for 15% or more of all ceramic particles and that the core parts have domains. However, a capacitor having dielectric layers comprised of the above dielectric ceramic composition only satisfies the JIS DJ or BJ characteristic and does not satisfy the X8R characteristic.

The assignee also proposed in Japanese Patent Application No. 2004-346846 a dielectric ceramic composition comprised of dielectric particles having a main ingredient phase and a diffusion phase. The dielectric ceramic composition described in this Japanese Patent Application No. 2004-346846 has a main ingredient containing barium titanate, a first sub ingredient containing at least one type of oxide selected from MgO, CaO, BaO, and SrO, a second sub ingredient including silicon oxide as its main ingredient, a third sub ingredient containing at least one type of oxide selected from $V_2O_5$, $MoO_3$, and $WO_3$, a fourth sub ingredient containing an oxide of R1 (where, R1 is at least one type of element selected from Sc, Er, Tm, Yb, and Lu), a fifth sub ingredient containing $CaZrO_3$ or $CaO+ZrO_2$, a sixth sub ingredient containing an oxide of R2 (where, R2 is at least one type of element selected from Y, Dy, Ho, Tb, Gd, and Eu), and a seventh sub ingredient containing MnO. The ratios of the sub ingredients to 100 moles of the main ingredient are as follows: first sub ingredient: 0.1 to 3 moles, second sub ingredient: 2 to 10 moles, third sub ingredient: 0.01 to 0.5 mole, fourth sub ingredient: 0.5 to 7 moles (where the number of moles of the fourth sub ingredient is the ratio of R1 alone), fifth sub ingredient: 0<fifth sub ingredient≦5 moles, sixth sub ingredient: 9 moles or less (where, the number of moles of the sixth sub ingredient is the ratio of R2 alone), and seventh sub ingredient: 0.5 mole or less.

The dielectric particles forming the dielectric ceramic composition described above have a main ingredient phase and a diffusion phase. By making the thickness of the diffusion phase, that is, the diffusion depth of the sub ingredient Ca, 10 to 30% in range of the average particle size D50 of the dielectric particles, the multilayer ceramic capacitor having dielectric layers comprised of this dielectric ceramic composition satisfies the X8R characteristic and realizes a good dielectric constant, insulation resistance (IR) life, and IR temperature dependency. However, suggestions are being sought for further improving the characteristics from other viewpoints.

SUMMARY OF THE INVENTION

An object of the present invention is to provide a dielectric ceramic composition satisfying the X8R characteristic and achieving a good high temperature accelerated life. Another object of the present invention is to provide a multilayer ceramic capacitor or other electronic device produced using this dielectric ceramic composition.

The inventors, to achieve these objects, took note of the dielectric particles having a surface diffusion structure and discovered that by reducing the dielectric particles having a domain in the main ingredient phase among the dielectric particles having a surface diffusion structure, the high temperature load life is improved and thereby completed the present invention.

That is, the dielectric ceramic composition according to the present invention is a dielectric ceramic composition comprised of at least dielectric particles having barium titanate as its main ingredient, wherein the ratio of dielectric particles having a surface diffusion structure including a main ingredient phase comprised of the main ingredient and a diffusion phase present around the main ingredient phase with respect to all of said dielectric particles is 60% or more, preferably 70 to 100%, and the ratio of dielectric particles having a domain in the main ingredient phase with respect to the dielectric particles having the surface diffusion structure is 20% or less, preferably 5 to 15%.

The surface diffusion structure is a structure of a main ingredient phase farming the center part of the dielectric particle and a diffusion phase covering the surface of that main ingredient phase. The main ingredient phase is substantially comprised of barium titanate, while the diffusion phase is comprised of barium titanate in which the sub ingredient is in solid solution. Further, the main ingredient phase exhibits a ferroelectric characteristic, while the diffusion phase exhibits a paraelectric characteristic. These phases differ physically and chemically. The presence of the dielectric particles having the surface diffusion structure can improve the characteristics.

Further, the main ingredient phase includes regions where a stripe-like wall called a "domain" is seen. This domain is a characteristic structure of a ferroelectric. When the sub ingredient diffuses into the main ingredient phase, the domain disappears and paraelectric characteristics are exhibited. Therefore, when applying a DC voltage, the applied voltage acts on the small dielectric ratio paraelectric phase, so a drop in the insulation resistance is suppressed. That is, the high temperature accelerated life, evaluated from the change in insulation resistance over time, can be improved.

Preferably, the ratio of the dielectric particles having the surface diffusion structure with respect to dielectric particles exhibiting the average particle size D50 is measured.

The electronic device according to the present invention has dielectric layers formed by the above dielectric ceramic composition. The electronic device is not particularly limited, but a multilayer ceramic capacitor, piezoelectric device, chip inductor, chip varistor, chip thermistor, chip resistor, or other surface mounted device (SMD) chip type electronic device may be mentioned.

The multilayer ceramic capacitor according to the present invention is comprised of dielectric layers made of the above dielectric ceramic composition and internal electrode layers alternately stacked. Further, it can satisfy the X8R characteristic and achieve a good high temperature accelerated life.

BRIEF DESCRIPTION OF THE DRAWINGS

These and other objects and features of the present invention will become clearer from the following description of the preferred embodiments given with reference to the attached drawings, wherein:

FIG. 3A is a schematic view of dielectric particles having a domain in the main ingredient phase, while FIG. 3B is a schematic view of dielectric particles not having a domain in the main ingredient phase.

DESCRIPTION OF THE PREFERRED EMBODIMENTS

Figure 1:
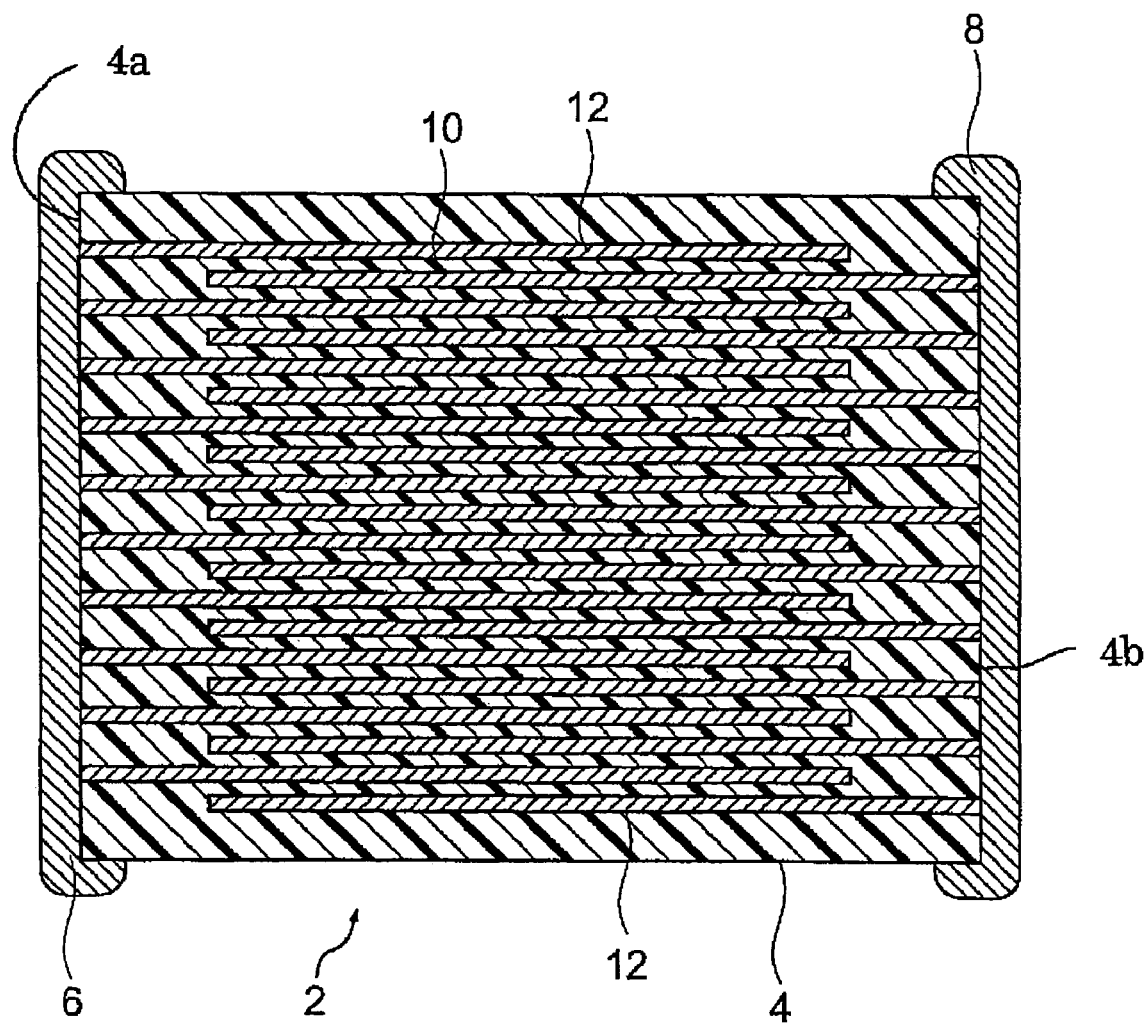
FIG. 1 is a schematic cross-sectional view of a multilayer ceramic capacitor according to an embodiment of the present invention.

As shown in FIG. 1, according to an embodiment of the present invention, the multilayer ceramic capacitor 2 has a capacitor body 4 comprised of dielectric layers 10 and internal electrode layers 12 alternately stacked. Every other internal electrode layer 12 is electrically connected to an inside of a first terminal electrode 6 formed at the outside of a first end 4a of the capacitor body 4. Further, the remaining internal electrode layers 12 are electrically connected to the inside of a second terminal electrode 8 formed at the outside of a second end 4b of the capacitor body 4.

The shape of the capacitor body 4 is not particularly limited and may be suitably selected in accordance with, the objective and application, but usually is a rectangular parallelepiped. The dimensions are also not limited and may be suitably selected in accordance with the objective and application. Usually, they are a length of 0.4 to 5.6 mm, a width of 0.2 to 5.0 mm, and a height of 0.2 to 1.9 mm or so.

Dielectric Layers

The dielectric layers 10 are made from the dielectric ceramic composition of the present invention. The thickness of the dielectric layers 10 should be suitably determined in accordance with the objective and application, but is preferably 10 μm or less, more preferably 7 μm or less.

The dielectric ceramic composition forming the dielectric layers 10 is not particularly limited, but for example, the following compositions may be mentioned.

First Aspect (X8R Characteristic)

The dielectric ceramic composition according to the first aspect of the invention has a main ingredient containing barium titanate (preferably expressed by the formula $Ba_mTiO_{2+m}$, where m is $0.995 \leq m \leq 1.010$ and the ratio of Ba and Ti is $0.995 \leq Ba/Ti \leq 1.010$), a first sub ingredient containing at least one oxide selected from MgO, CaO, BaO, and SrO, a second sub ingredient containing silicon oxide as its main ingredient, a third sub ingredient containing at least one oxide selected from $V_2O_5$, $MoO_3$, and $WO_3$, a fourth sub ingredient containing an oxide of R1 (wherein R1 is at least one element selected from Sc, Er, Tm, Yb, and lax), a fifth sub ingredient containing $CaZrO_3$ or $CaO+ZrO_2$ in accordance with need, a sixth sub ingredient containing an oxide of R2 (wherein R2 is at least one element selected from Y, Dy, Ho, Tb, Gd, and Eu), and a seventh sub ingredient containing MnO.

The ratios of the sub ingredients with respect to the main ingredient $BaTiO_3$ are, with respect to 100 moles of $BaTiO_3$, first sub ingredient: 0.1 to 3 moles,
second sub ingredient: 2 to 10 moles,
third sub ingredient: 0.01 to 0.5 mole,
fourth sub ingredient: 0.5 to 7 moles,
fifth sub ingredient: $0 \leq$ fifth sub ingredient $\leq 5$ moles,
sixth sub ingredient: 9 moles or less, and
seventh sub ingredient: 0.5 mole or less, preferably,
first sub ingredient: 0.1 to 2.5 moles,
second sub ingredient: 2.0 to 5.0 moles,
third sub ingredient: 0.1 to 0.4 mole,
fourth sub ingredient: 0.5 to 5.0 moles,
fifth sub ingredient: 0.5 to 3 mole,
sixth sub ingredient: 0.5 to 9 moles, and
seventh sub ingredient: 0.01 to 0.5 mole.

Note that the ratio of the fourth sub ingredient and sixth sub ingredient are not the molar ratio of the oxide of R1 and R2, but the molar ratio of the R1 and R2 alone. That is, for example, when using a fourth sub ingredient comprised of an oxide of Yb, a ratio of the fourth sub ingredient of 1 mole means not that the ratio of $Yb_2O_3$ is 1 mole, but that the ratio of Yb is 1 mole.

By incorporating the first to fourth sub ingredients and, as necessary incorporating the fifth to seventh sub ingredients, the X8R characteristic can be satisfied. The preferable contents of the first to seventh sub ingredients and the reasons for the same are as follows:

The first sub ingredient (MgO, CaO, BaO, and SrO) exhibits the effect of flattening the capacity-temperature characteristic. If the first sub ingredient is too small in content, the rate of capacity-temperature change ends up becoming large. On the other hand, if the content is too large, the sinterability deteriorates. Note that the ratio of the oxides of the first sub ingredient may be any ratio.

The second sub ingredient (containing silicon oxide as main ingredient) may act as a sintering aid, but has an effect of reducing the defect rate of the initial insulation resistance when reducing the thickness of the dielectric layers. If the second sub ingredient is too small in content, the capacity-temperature characteristic deteriorates and the IR (insulation resistance) falls. On the other hand, if the content is too large, the IR life becomes insufficient and the dielectric constant ends up rapidly dropping.

The third sub ingredient ($V_2O_5$, $MoO_3$, and $WO_3$) exhibits the effect of flattening the capacity-temperature characteristic at the Curie temperature or more and the effect of improving the IR life. If the third sub ingredient is too small in content, such effects become insufficient. On the other hand, if the content is too large, the IR remarkably falls. Note that the ratio of the oxides of the third sub ingredient may be any ratio.

The fourth sub ingredient (oxide of R1) exhibits the effect of shifting the Curie temperature to the high temperature side and the effect of flattening the capacity-temperature characteristic. If the fourth sub ingredient is too small in content, such effects become insufficient and the capacity-temperature characteristic ends up deteriorating. On the other hand, if the content is too large, the sinterability tends to deteriorate. Among the fourth sub ingredients, due to its high effect of improvement of the characteristics and its inexpensive cost, an oxide of Yb is preferable.

The fifth sub ingredient ($CaZrO_3$ has the effect of shifting the Curie temperature to the high temperature side and the effect of flattening the capacity-temperature characteristic. However, if the fifth sub ingredient is too large in content, the IR accelerated life remarkably deteriorates and the capacity-temperature characteristic (X8R characteristic) ends up deteriorating.

By adjusting the contents of the fourth sub ingredient (oxide of R1) and the fifth sub ingredient ($CaZrO_3$), it is possible to flatten the capacity-temperature characteristic (X8R characteristic) and improve the high temperature accelerated life. In particular, in the above-mentioned range of contents, precipitation of different phases is suppressed and the structure can be made uniform. If the fourth sub ingredient is too large in content, giant needle-shaped crystals, that is, a pyrochlora phase, easily precipitate and remarkable deterioration in characteristics is observed when reducing the thickness between the dielectric layers of the multilayer ceramic capacitor. On the other hand, if the fourth sub ingredient is too small in content, the capacity-temperature characteristic can no longer be satisfied. If the fifth sub ingredient is too large in content, the capacity-temperature characteristic becomes worse and the IR accelerated life also deteriorates.

The sixth sub ingredient (oxide of R2) exhibits the effect of improving the IR and IR life and has little detrimental effect on the capacity-temperature characteristic. However, if the R2 oxide is too large in content, the sinterability tends to deteriorate. Among the sixth sub ingredients, due to the high effect in improving the characteristics and inexpensive cost, an oxide of Y is preferable.

The seventh sub ingredient (MnO) exhibits an effect of promoting sintering, an effect of raising the IR, and an effect of improving the IR life. To sufficiently obtain such effects, the ratio of the seventh sub ingredient to 100 moles of $BaTiO_3$ is made 0.01 mole or more. However, if the seventh sub ingredient is too large in content, the capacity-temperature characteristic is detrimentally affected, so preferably the content is 0.5 mole or less.

Preferably, the second sub ingredient is expressed as at least one oxide selected from $SiO_2$, MO (where, M is at least one element selected from Ba, Ca, Sr, and Mg), $Li_2O$, and $B_2O_3$.

More preferably, the second sub ingredient is expressed as $(Ba,Ca)_xSiO_{2+x}$ (where, x=0.7 to 1.2). The BaO and CaO in the $(Ba,Ca)_xSiO_{2+x}$ of a more preferable form of the second sub ingredient are also contained in the first sub ingredient, but the complex oxide $(Ba,Ca)_xSiO_{2+x}$ has a low melting point, so the reactivity with the main ingredient is good. Therefore, in the present invention, BaO and/or CaO are preferably added also as the complex oxide. The x in the $(Ba,Ca)_xSiO_{2+x}$ of a more preferable form of the second sub ingredient is preferably 0.7 to 1.2, more preferably 0.8 to 1.1. If x is too small, that is, if the ratio of $SiO_2$ is too large, this reacts with the main ingredient $BaTiO_3$ and causes the dielectric characteristic to deteriorate. On the other hand, if x is too large, the melting point of $(Ba,Ca)_xSiO_{2+x}$ becomes high and the sinterability is degraded, so this is not preferable. Note that the ratio of Ba and Ca may be any ratio. Just one alone may also be included.

The total content of the fourth sub ingredient and sixth sub ingredient is, with respect to 100 moles of the main ingredient $BaTiO_3$, preferably 13 moles or less, further preferably 10 moles or less (however, the numbers of moles of the fourth sub ingredient and sixth sub ingredient are ratios of R1 and R2 alone). This is to maintain a good sinterability.

Second Aspect (X8R Characteristic)

The dielectric composition according to the second aspect has a main ingredient containing barium titanate (preferably expressed by the formula $Ba_mTiO_{2+m}$, where m is $0.995 \leq m \leq 1.010$ and the ratio of Ba and Ti is $0.995 \leq Ba/Ti \leq 1.010$), a first sub ingredient containing an oxide of AE (where, AE is at least one element selected from Mg, Ca, Ba, and Sr), a second sub ingredient containing an oxide of R (where, R is at least one element selected from Y, Dy, Tm, Ho, and Er), a third sub ingredient containing $M_xSiO_3$ (where M is at least one element selected from Ba, Ca, Sr, Li, and B, when M=Ba, x=1, when M=Ca, x=1, when M=Sr, x=1, when M=Li, x=2, and when M=B, x=2/3), a fourth sub ingredient containing MnO, a fifth sub ingredient containing at least one type of oxide selected from $V_2O_5$, $MoO_3$, and $WO_3$, and a sixth sub ingredient containing $CaZrO_3$ or $CaO+ZrO_2$ in accordance with need.

By incorporating the first to fifth sub ingredients and, as needed, the sixth ingredient, it is possible to maintain a high dielectric constant and satisfy the X8R characteristic. The preferable contents of the first to sixth sub ingredients and the reasons for the same are as follows.

The ratio of the first sub ingredient with respect to 100 moles of the main ingredient is preferably 0 to 0.1 mole (however, excluding 0 mole and 0.1 mole), preferably 0.01 to 0.1 mole (however, excluding 0.1 mole), more preferably 0.04 to 0.08 mole.

The ratio of the second sub ingredient with respect to 100 moles of the main ingredient is preferably 1 to 7 moles (however, excluding 1 mole and 7 moles), preferably 1 to 6 moles (however, excluding 1 mole), more preferably 3 to 5 moles.

The ratio of the third sub ingredient with respect to 100 moles of the main ingredient is preferably 2 to 10 moles, more preferably 2 to 6 moles.

The ratio of the fourth sub ingredient with respect to 100 moles of the main ingredient is preferably 0 to 0.5 mole (however, excluding 0 mole), more preferably 0.1 to 0.5 mole.

The ratio of the fifth sub ingredient with respect to 100 moles of the main ingredient is preferably 0.01 to 0.5 mole, more preferably 0.01 to 0.2 mole.

The ratio of the sixth sub ingredient with respect to 100 moles of the main ingredient is preferably 0 to 5 moles (however, excluding 5 moles), more preferably 0 to 3 moles.

The reasons for limitation of the contents of the sub ingredients are as follows:

If the first sub ingredient is too small in content, the capacity-temperature characteristic deteriorates overall. On the other hand, if the content of the first sub ingredient increases over the range of the present invention, capacity-temperature characteristic at the high temperature side tends to deteriorate again.

If the second sub ingredient is too small in content, the capacity-temperature characteristic ends up deteriorating. On the other hand, if the content is too large, the sinterability tends to rapidly deteriorate. In particular, by making the content of the first sub ingredient as small as possible to increasing the content of the second sub ingredient, there is the merit that the capacity-temperature characteristic can be flattened more.

If the ratio of the number of moles of the second sub ingredient to the number of moles of the first sub ingredient (second sub ingredient/first sub ingredient) is too small, the capacity-temperature characteristic ends up deteriorating and the X8R characteristic cannot be satisfied. On the other hand, if the ratio is too large, the sinterability tends to deteriorate.

Note that the ratio of the second sub ingredient is not the molar ratio of the R itself, but the molar ratio of the oxide of R. That is, for example, when using a second sub ingredient comprised of an oxide of Y, a ratio of the second sub ingredient of 1 mole means not that the ratio of Y is 1 mole, but the ratio of $Y_2O_3$ is 1 mole.

If the third sub ingredient is too small in content, the capacity-temperature characteristic tends not to be able to be satisfied and the insulation resistance tends to deteriorate, in particular, the sinterability tends to remarkably worsen. On the other hand, if the content is too large, the life characteristic of the insulation resistance becomes insufficient and the dielectric constant tends to rapidly drop. Note that the ratio of the oxides in the third sub ingredient may be any ratio.

If the fourth sub ingredient is too large in content, this has a detrimental effect on the capacity-temperature characteristic and is liable to cause the IR life to deteriorate.

If the fifth sub ingredient is too small in content, the above-mentioned effect tends to become insufficient. On the other hand, if the content is too large, the IR remarkably falls. Note that the ratio of the oxides in the fifth sub ingredient may be any ratio.

If the amount of the sixth sub ingredient added is too great, the IR life remarkably falls and the capacity-temperature characteristic tends to deteriorate.

In both the first aspect and the second aspect of the invention, the form of addition of $CaZrO_3$ is not particularly limited, but CaO or another oxide including Ca, $CaCO_3$ or another carbonate, an organic compound, $CaZrO_3$, etc. may be mentioned. The ratio of Ca and Zr is not particularly limited, but should be set to an extent where they do not enter into solid solution in the main ingredient $BaTiO_3$, but the molar ratio of Ca to Zr (Ca/Zr) is preferably 0.5 to 1.5, more preferably 0.8 to 1.5, further preferably 0.9 to 1.1.

Structure of Dielectric Particles

Figure 2:
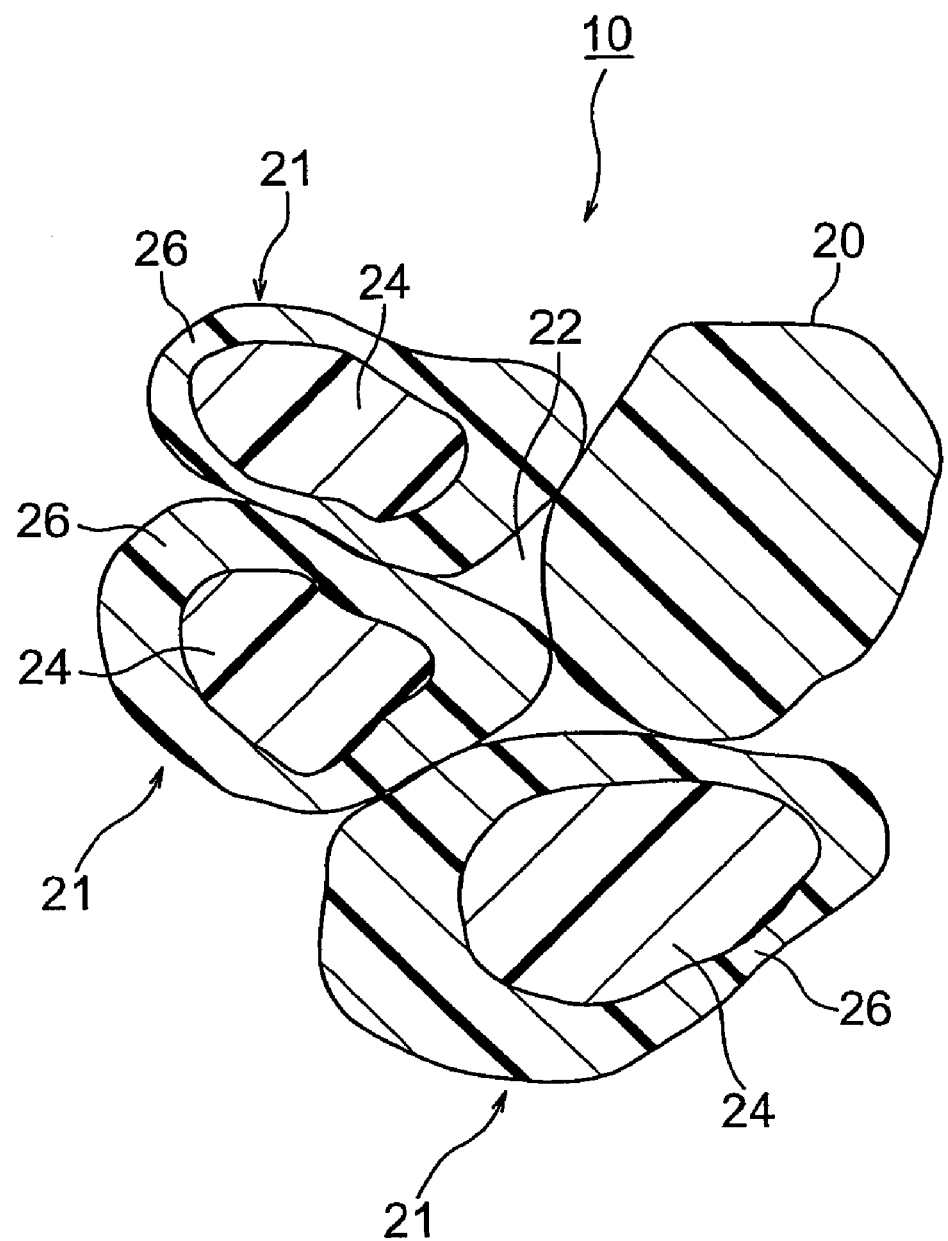
FIG. 2 is a cross-sectional view of dielectric particles forming the dielectric layers shown in FIG. 1.

The dielectric layers 10 comprised of the above dielectric ceramic composition, as shown in FIG. 2, are comprised of first dielectric particles 20 and second dielectric particles 21 and grain boundary phases 22 formed between the adjoining first dielectric particles 20 and second dielectric particles 21.

The first dielectric particles 20 do not have a surface diffusion structure, but the second dielectric particles 21 have a main ingredient phase 24 and a diffusion phase 26. The main ingredient phase 24 is substantially comprised of barium titanate and exhibits a ferroelectric characteristic. Further, the diffusion phase 26 is comprised of an element added to the dielectric material as a sub ingredient diffused (entering solid solution) in the barium titanate and exhibits a paraelectric characteristic. The ratio of the second dielectric particles 21 having the surface diffusion structure is 60% or more with respect to the dielectric particles as a whole (first dielectric particles 20 and second dielectric particles 21), preferably 70 to 100%, more preferably 80 to 90%.

In this embodiment, whether the surface diffusion structure is present is judged by the following method. When measuring the concentrations of the sub ingredients in the dielectric particles from the surface toward the center, the concentrations of the sub ingredient elements sometimes rapidly fall. At this time, if the concentrations of the elements are 0.5% or less in all regions closer to the center part from this point, the regions are defined the main ingredient phase and the dielectric particles can be judged as having a surface diffusion structure.

On the other hand, when the concentrations of the sub ingredient elements fall by a gentle gradient from the surface of the dielectric particles to the center or even if the concentrations of the sub ingredient elements sharply drop, when there is no region where the concentrations of the sub ingredients become 0.5% or less, the dielectric particles can be judged as not having a surface diffusion structure.

In the second dielectric particles 21 having the surface diffusion structure, usually the main ingredient phase has a domain, but the main ingredient phase sometimes does not have any domain. A "domain" is a 90° region as seen in a ferroelectric. It is observed as a region with stripe pattern wall such as shown in FIG. 3A. When the main ingredient phase does not have a domain, as shown in FIG. 3B, no stripe-like pattern is seen. The ratio of the particles having a domain in the main gradient phase with respect to the second dielectric particles 21 having the surface diffusion structure is 20% or less, preferably 5 to 15%, more preferably 10 to 13%.

In the present embodiment, the particles where a stripe-like wall is seen in the main ingredient phase among the second dielectric particles 21 having a surface diffusion as a result of observation under a TEM, are defined as the dielectric particles having a domain in the main ingredient phase.

The dielectric particles measured for the concentrations of elements diffused in the diffusion phase are not particularly limited, but it is preferable to measure dielectric particles exhibiting the value of the average particle size D50.

The particle size of a dielectric particle is the value obtained when slicing open a capacitor device body 4 in the stacking direction of the dielectric layers 10 and internal electrode layers 12, measuring the average area of the dielectric particles in the cross-section shown in FIG. 2, calculating the circle equivalent diameter as the diameter, and multiplying this by 1.5. This is measured for at least 200 dielectric particles. The value where the cumulative total becomes 50% from the distribution of the cumulative total number of obtained particle sizes is defined as the average particle size D50 (unit: μm).

The D50 is not particularly limited in the present embodiment, but should be suitably determined from for example 0.1 to 3 μm in range in accordance with the thickness of the dielectric layers 10 etc. The capacity-temperature characteristic deteriorates the thinner the dielectric layers 10 and, further, tends to deteriorate the smaller the average particle size D50 of the dielectric particles. For this reason, the dielectric ceramic composition of the present invention is particularly effective when it is necessary to reduce the average particle size, specifically, when the average particle size is 0.1 to 0.5 μm. Further, if the average particle size is made smaller, the IR life becomes longer and, further, there is less change in the capacity over time under a DC field, so from this viewpoint as well, a small average particle size is preferable.

Internal Electrode Layers

The conductive material included in the internal electrode layers 12 is not particularly limited, but since the material forming the dielectric layers 10 has resistance to reduction, a base metal can be used. As the base metal used as the conductive material, Ni or an Ni alloy is preferable. As the Ni alloy, an alloy of at least one element selected from Mn, Cr, Co, and Al with Ni is preferable. A content of Ni in the alloy of 95 wt % or more is preferable.

Note that the Ni or Ni alloy may also contain P and various other types of trace ingredients in amounts of 0.1 wt % or so or less.

The thickness of the internal electrode layers may be suitably set in accordance with the application etc., but usually is 0.5 to 5 μm. In particular, 0.5 to 1.5 μm or so is preferable.

Terminal Electrodes

The conductive material contained in the terminal electrodes 6 and 8 is not particularly limited, but in the present invention, the inexpensive Ni or Cu and their alloys may be used. Further, the thickness of the terminal electrodes 6 and 8 may be suitably determined in accordance with the application etc., but usually 10 to 50 μm or so is preferable.

Method of Production of Multilayer Ceramic Capacitor

The multilayer ceramic capacitor using the dielectric ceramic composition of the present invention is produced in the same way as a conventional multilayer ceramic capacitor by preparing a green chip using a paste by the usual printing method or sheet method, firing this, then printing or transferring and firing terminal electrodes. Below, the method of production will be specifically explained.

First, the dielectric material powder to be contained in the dielectric layer paste is prepared and formed into a paste to prepare the dielectric layer paste. The dielectric layer paste may be an organic-based paste comprised of the dielectric material powder and an organic vehicle kneaded together or a water-based paste.

As the dielectric material powder, the above oxides or their mixtures or complex oxides may be used, but it is also possible to use, in addition to the above oxides, various types of compounds giving those oxides or complex oxides upon firing, such as carbonates, oxalates, nitrates, hydroxides, organometallic compounds, etc. selected and mixed together.

In this specification, the oxides forming the main ingredient and the sub ingredients are expressed by stoichiochemical compositions, but the oxidized states of the oxides may also deviate from the stoichiochemical compositions. The ratios of the sub ingredients are found by converting the amounts of metals contained in the oxides forming the sub ingredients to oxides of the above stoichemical compositions.

The dielectric material powder mixed in the predetermined ratio is calcined to control the ratio of the dielectric particles having a surface diffusion structure and the ratio of the dielectric particles having a domain in the main ingredient phase. A first method is to divide the dielectric material into suitable amounts, calcine them under different conditions, then mix them after calcining. A second method is to perform first calcining during which only adding part of the sub ingredient and then perform second calcining during which adding the remaining sub ingredient. With both methods, control of the ratio of the dielectric particles having a surface diffusion structure and the ratio of the dielectric particles having a domain in the main ingredient phase becomes possible. In the state before conversion into a paste, the particle size of the dielectric ceramic composition powder is usually an average particle size of 0.1 to 1.0 μm or so.

The "organic vehicle" is comprised of a binder dissolved in an organic solvent. The binder used for the organic vehicle is not particularly limited, but may be suitably selected from ethyl cellulose, polyvinyl butyral, and other usual types of binders. Further, the organic solvent used is not particularly limited, but may be suitably selected from terpineol, butyl carbitol, acetone, toluene, or other various types of organic solvents in accordance with the printing method, sheet method, or other method of use.

Further, when making the dielectric layer paste a water-based paste, it is sufficient to knead together a water-based vehicle comprised of a water-soluble binder or dispersant etc. dissolved in water and the dielectric material. The water-soluble binder used for the water-based vehicle is not particularly limited, but for example, polyvinyl alcohol, cellulose, water-soluble acrylic resin, etc. may be used.

The internal electrode layer paste is prepared by kneading a conductive material comprised of the above various types of conductive metals or alloys or various types of oxides, organometallic compounds, resinate, etc. giving the conductive material after firing with the above organic vehicle. Further, the terminal electrode paste may be prepared in the same way as the above internal electrode layer paste.

The content of the organic vehicle in the paste is not particularly limited and may be made a usual content, for example, a 1 to 5 wt % or so of a binder and 10 to 50 wt % or so of a solvent. Further, the paste may contain, in accordance with need, various types of additives selected from dispersants, plasticizers, dielectrics, insulators. The total content of these is preferably 10 wt % or less.

When using the printing method, the dielectric layer paste and internal electrode layer paste are successively printed on a PET or other substrate which is then cut into predetermined shapes. Each assembly is then peeled off from the substrate to obtain a green chip.

Further, when using the sheet method, the dielectric layer paste is used to form green sheets, an internal electrode layer paste is printed on the sheets, then the sheets are stacked to obtain a green chip.

Before firing, the green chip is treated to remove the binder. The binder removal treatment may be suitable determined in accordance with the type of the conductive material in the internal electrode layer paste.

Further, as other binder removal conditions, the rate of temperature rise is preferably 5 to 300° C./hour, the holding temperature is preferably 180 to 400° C., and the temperature holding time is preferably 10 to 100 hours. Further, the firing atmosphere is preferably the air or a reducing atmosphere. As the atmosphere gas in the reducing atmosphere, for example a mixed gas of $N_2$ and $H_2$ which is wetted is preferable.

The atmosphere of firing the green chip may be suitably selected in accordance with the type of the conductive material in the internal electrode layer paste, but when using Ni, an Ni alloy, or other base metal as the conductive material, the firing atmosphere preferably has an oxygen partial pressure of $10^{-12}$ to $10^{-8}$ atm. If the oxygen partial pressure is too low, the conductive material of the internal electrode layers sinters abnormally and the electrodes sometimes break. Further, if too high, internal electrode layers tend to oxidize.

Further, the holding temperature of firing is preferably 1100 to 1400° C. If the holding temperature is too low, the densification becomes insufficient, while if too high, abnormal sintering of the internal electrode layers causes electrode breakage or diffusion of the material of the internal electrode layers causes the capacity-temperature characteristic to deteriorate and the dielectric ceramic composition to easily be reduced.

As other firing conditions, the rate of temperature rise is preferably 50 to 500° C./hour, the temperature holding time is preferably 0.5 to 8 hours, and the cooling rate is preferably 50 to 500° C./hour. Further, the firing atmosphere is preferably made a reducing atmosphere. As the atmosphere gas, for example, a mixed gas of $N_2$ and $H_2$ which is further wetted is preferable.

When firing in a reducing atmosphere, the capacitor device body is preferably annealed. The annealing is treatment for reoxidizing the dielectric layers. This enables the IR life to be remarkably extended, so the reliability rises.

The oxygen partial pressure in the annealing atmosphere is preferably $10^{-7}$ to $10^{-6}$ atm. If the oxygen partial pressure is too low, reoxidiation of the dielectric layers will be difficult. If too high, the internal electrode layers will tend to oxidize.

The holding temperature of the annealing is preferably 500 to 1100° C. If the annealing temperature is too low, in general, the dielectric layers will be insufficiently oxidized, so the IR will be low and, further, the IR life will easily become shortened. On the other hand, if the holding temperature of the annealing is too high, the internal electrode layers will oxidize and the capacitance will fall. Further, the internal electrode layers will end up reacting with the dielectric material and the capacity-temperature characteristic will easily deteriorate, the IR fall, and the IR life fall.

Further, as the atmosphere gas for the annealing, for example, it is preferable to use wetted $N_2$ gas etc.

In the binder removal treatment, firing, and annealing, the $N_2$ gas or mixed gas etc. may be wet by for example using a wetter. In this case, the water temperature is preferably 5 to 75° C. or so.

The binder removal treatment, firing, and annealing may be performed consecutively or performed independently. When performing these consecutively, after the binder removal treatment, it is preferable to change the atmosphere without cooling, then raise the temperature to the holding temperature of firing and perform the firing, cool, then change the atmosphere when reaching the holding temperature of the annealing and perform the annealing.

The thus obtained capacitor device body is polished at its end faces by for example barrel polishing, sand blasting, etc., and printed or transferred and fired with terminal electrode paste to form the terminal electrodes 6, 8. The terminal electrode paste is preferably baked on, for example, in a mixed gas of $N_2$ and $H_2$ at, in the present embodiment, 600 to 800° C. for approximately 10 minutes to 1 hour. In accordance with need, the terminal electrodes 6, 8 are plated on their surfaces to form covering layers.

The thus produced multilayer ceramic capacitor of the present invention is mounted by soldering etc. on a printed circuit board etc. which is then used for various types of electronic apparatuses etc.

The multilayer ceramic capacitor of the present embodiment has a composition satisfying the X8R characteristic as explained above. The dielectric particles are comprised of particles having surface diffusion structures and particles not having surface diffusion structures mixed together. For example, by changing the calcining conditions, the ratio of the dielectric particles having a surface diffusion structure and the ratio of the dielectric particles having a domain in the main ingredient phase can be controlled and a good high temperature accelerated life can be realized.

While an embodiment of the present invention was explained above, the present invention is not limited to the above-mentioned embodiment in any way and can be modified in various ways within a scope not departing from the gist of the present invention.

For example, in the above-mentioned embodiment, the calcining conditions were changed to make the ratio of the dielectric particles having a domain in the main ingredient phase a predetermined range, but as another method, the method of controlling the dispersion ability of the dielectric paste etc. may be mentioned. Further, as the electronic device according to the present invention, a multilayer ceramic capacitor was illustrated, but the electronic device according to the present invention is not limited to a multilayer ceramic capacitor and may be any device having dielectric layers formed by the above dielectric ceramic composition. Further, in the above embodiment, the present invention was applied to a dielectric ceramic composition satisfying the X8R characteristic, but the present invention can also be applied to a dielectric ceramic composition satisfying the X7R characteristic.

EXAMPLES

Below, the present invention will be explained based on more detailed examples, but the present invention is not limited to these examples.

Example 1

As the main ingredient material, $BaTiO_3$ was prepared, while as the sub ingredient materials, for MgO and MnO materials, the carbonates $MgCO_3$ and $MnCO_3$ were prepared. As the remaining sub ingredient materials, $V_2O_5$, $Y_2O_3$, $Yb_2O_3$, $CaZrO_3$, and $(Ba_{0.6}Ca_{0.4})SiO_3$ were prepared. Note that $CaZrO_3$ was produced by wet mixing $CaCO_3$ and $ZrO_2$ by a ball mill for 16 hours, drying the result, firing it at 1150° C. in the air, then wet crushing the result further by a ball mill for 24 hours. Further, the glass ingredient $(Ba_{0.6}Ca_{0.4})SiO_3$ was produced by wet mixing $BaCO_3$, $CaCO_3$, and $SiO_2$ by a ball mill for 16 hours, drying the result, firing it at 1150° C. in the air, then wet crushing the result by a ball mill for 100 hours.

Next, these materials were weighed to give, with respect to 100 moles of $BaTiO_3$ in the composition after firing, 1 mole of MgO, 0.37 mole of MnO, 0.1 mole of $V_2O_5$, 2 moles of $Y_2O_3$, 1.75 moles of $Yb_2O_3$, 1.5 moles of $CaZrO_3$, and 3 moles of $(Ba_{0.6}Ca_{0.4})SiO_3$. In the case of each sub ingredient material, the amount weighed here become the finally added amount. The weighed materials were wet mixed by a ball mill for 16 hours. The resultant slurry was dried, then the dried powder was divided into two equal amounts which were then calcined under the following two conditions.

Conditions 1,
rate of temperature rise: 200° C./hour
holding temperature: 700° C.
holding time: 2 hours
atmosphere: air and
Conditions 2,
rate of temperature rise: 200° C./hour
holding temperature: 800° C.
holding time: 2 hours
atmosphere: air.

The powders calcined under the above conditions were crushed and mixed to obtain a dielectric material. 100 parts by weight of the obtained dielectric material, 4.8 parts by weight of an acrylic resin, 100 parts by weight of ethyl acetate, 6 parts by weight of a mineral spirit, and 4 parts by weight of toluene were mixed by a ball mill to form a paste and thereby obtain a dielectric layer paste.

Next, 100 parts by weight of Ni particles with an average particle size of 0.4 µm, 40 parts by weight of an organic vehicle (8 parts by weight of ethyl cellulose dissolved in 92 parts by weight of butyl carbitol), and 10 parts by weight of butyl carbitol were kneaded by a triple roll to form a paste and thereby obtain an internal electrode layer paste.

The obtained dielectric layer paste was used to form sheets on a PET film by the doctor blade method, then was dried to form green sheets. At this time, the green sheets had a thickness of 4.5 µm. The internal electrode paste was printed over these, then the sheets were peeled off from the PET film. Next, these green sheets and protective green sheets (not printed with internal electrode layer paste) were stacked and pressed to obtain green chips.

Next, each green chip was cut to a predetermined size, treated to remove the binder, fired, and annealed under the following conditions to prepare a multilayer ceramic sintered body.

The binder removal treatment was performed under the following conditions:
rate of temperature rise: 60° C./hour,
holding temperature: 260° C.,
holding time: 8 hours,
atmosphere: air.

The firing was performed under the following conditions:
rate of temperature rise: 200° C./hour,
holding temperature: 1240° C.,
holding time: 6 hours,
oxygen partial pressure: $10^{-11}$ atm,
atmosphere: $H_2$—$N_2$—$H_2O$ gas.

The annealing was performed under the following conditions:
rate of temperature rise: 200° C./hour,
holding temperature: 1000° C.,
holding time: 2 hours,
oxygen partial pressure: $10^{-7}$ atm,
atmosphere: wetted $N_2$ gas.

Note that the atmosphere gas of firing and annealing treatment was wet using a wetter with a water temperature of 35° C.

Each thus obtained sintered body was coated on its two surfaces with In—Ga to form terminal electrodes to thereby obtain a sample of the capacitor.

Each obtained capacitor had a size of 3.2 mm×1.6 mm×0.6 mm, four dielectric layers sandwiched between internal electrode layers, a thickness of each dielectric layer (interlayer thickness) of 3.5 µm, and a thickness of each internal electrode layer of 1.0 µm.

Next, the ratio of the dielectric particles having a surface diffusion structure and the ratio of the dielectric particles having a domain in the main ingredient phase were calculated by the following method for each obtained capacitor sample.

Ratio of Dielectric Particles Having Surface Diffusion Structure

First, First, the obtained capacitor sample was sliced open perpendicular to the stacking direction and the cut surface was polished. Further, that polished surface was chemically etched, then examined by a scanning electron microscope (SEM). Using the code method and assuming the dielectric particles to be spherical in shape, 250 dielectric particles were measured for particle size. The average value of the particle size for the measured dielectric particles was defined as the average particle size D50. D50 was 0.32 µm.

Figure 4:
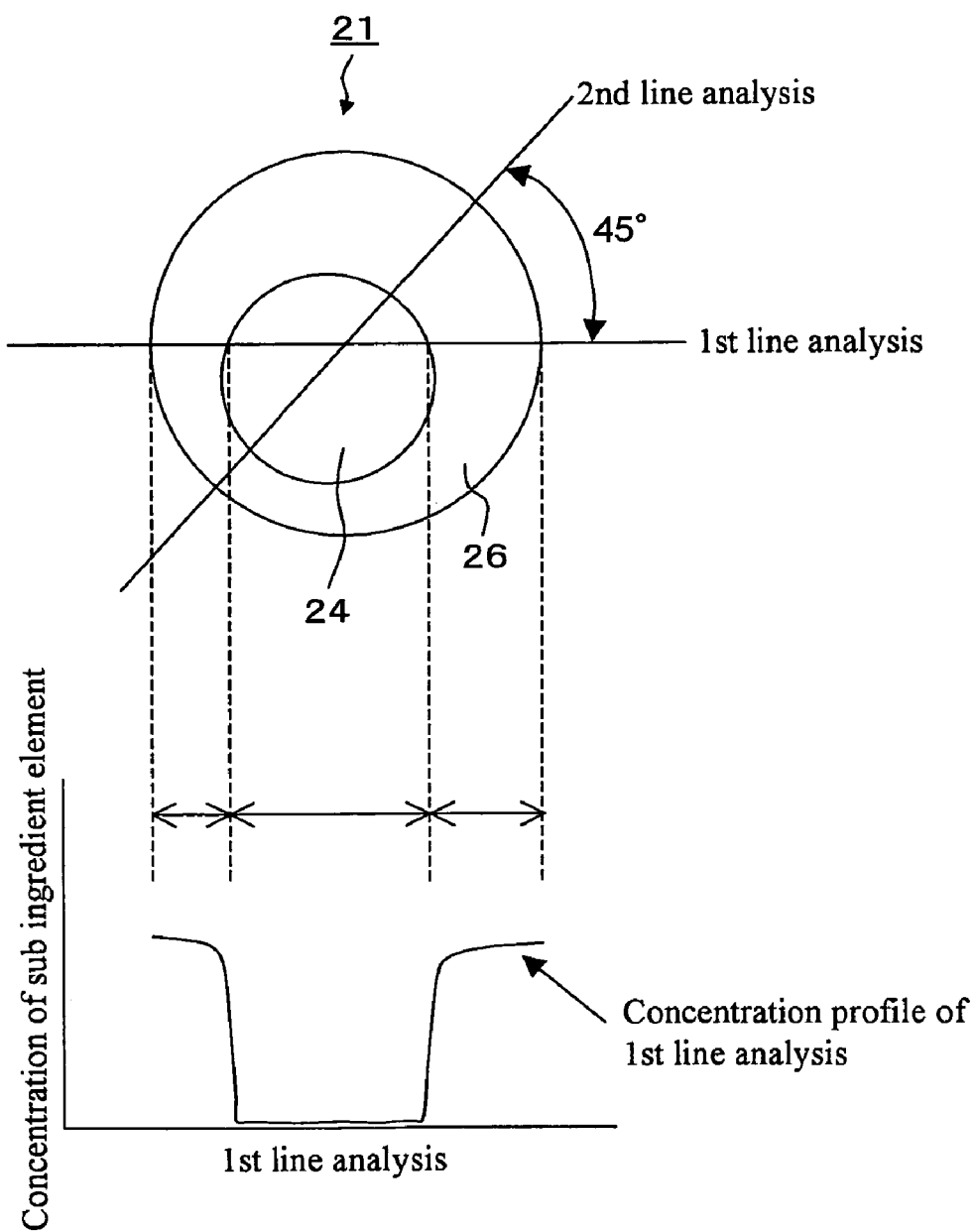
FIG. 4 is a schematic view for explaining the method of judging whether the surface diffusion structure exists in dielectric particles or not in the examples.

Next, for each dielectric particle exhibiting a value the same as the average particle size D50, as shown in FIG. 4, a line was drawn connecting the two ends of the particle so as to pass through the center of the particle. An energy dispersive type X-ray spectroanalyzer attached to a transmission electron microscope (TEM) was used for line analysis along that line to measure the concentration distribution of the sub ingredients Yb, Mg, and Ca. Further, the line was shifted 45 degrees and a similar line analysis performed to measure the concentration distribution. From the measurement results, particles where phases with almost none of the above elements diffused in them (main ingredient phase) could be identified were designated as "dielectric particles having a surface diffusion structure". The ratio of these with respect to the measured dielectric particles as a whole was calculated. The ratio of dielectric particles having a surface diffusion structure was a good one of 60% or more. The results are shown in Table 1.

Ratio of Dielectric Particles Having Domain in Main Ingredient Phase

Figure 3:
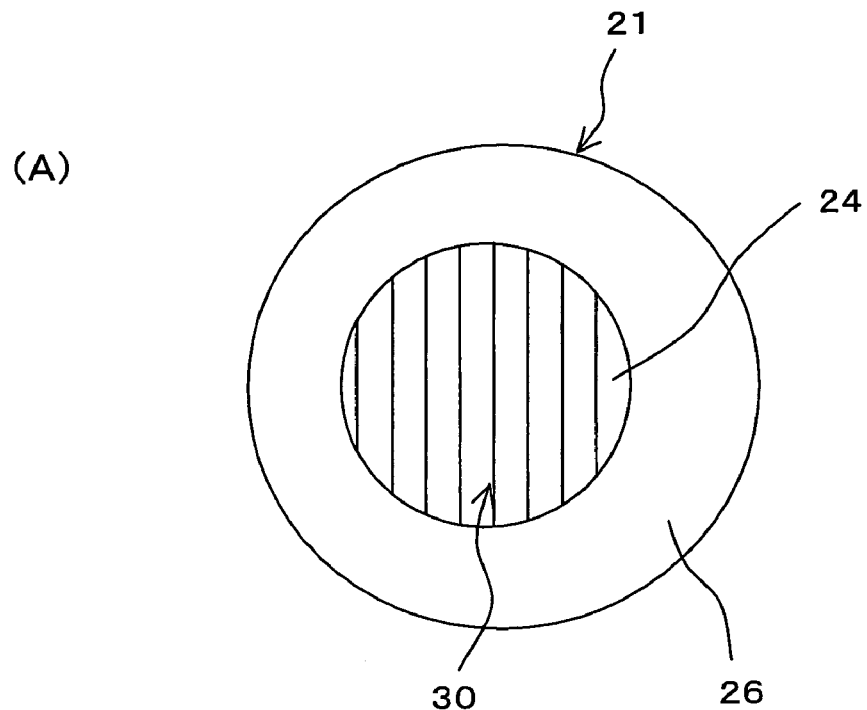
Figure 3:
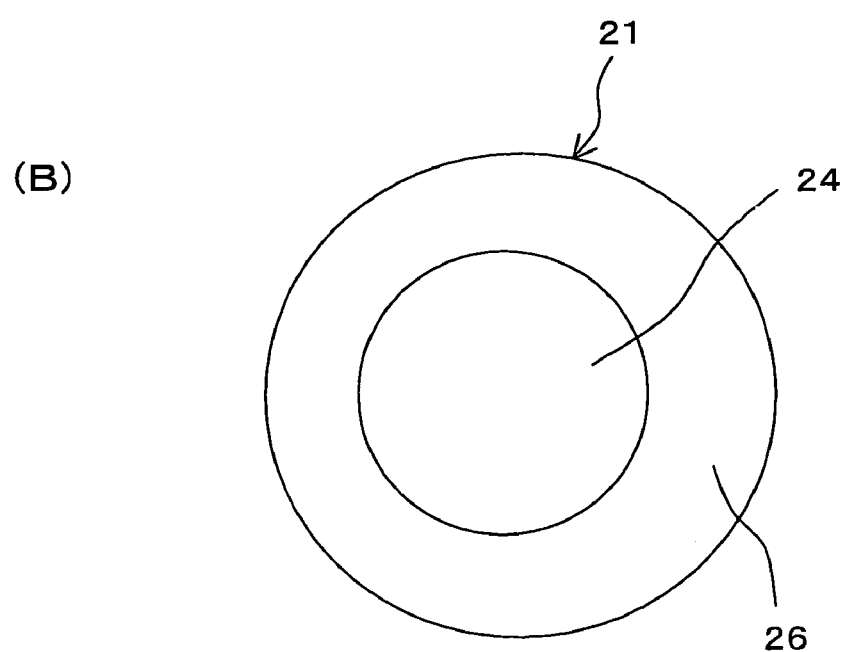

Further, particles exhibiting the stripe-like pattern such as shown in FIG. 3 under observation by a TEM among the dielectric particles having a surface diffusion structure were define as "particles having a domain". The number of particles having a domain were counted and the ratio with respect to the dielectric particles having a surface diffusion structure measured as explained above was calculated. A ratio of dielectric particles having a domain in the main ingredient phase was a good one of 20% or less. The results are shown in Table 1.

Evaluation of Characteristics

Obtained capacitor samples were evaluated for the dielectric constant, capacity-temperature characteristic, and high temperature accelerated life.

The dielectric constant ($\in$) was calculated from the electrostatic capacity measured for each capacitor sample at the reference temperature 25° C. by a digital LCR meter (made by YHP, Model 4274A) under conditions of a frequency of 1 kHz and an input signal level (measurement voltage) of 1.0 Vrms. The evaluation criteria was 1000 or more as "good". The results are shown in Table 1.

For the capacity-temperature characteristic (TC), an obtained sample was measured for electrostatic capacity at −55° C. to 150° C. in temperature range. The electrostatic capacity was measured using a digital LCR meter (made by YHP, Model 4274A) under conditions of a frequency of 1 kHz and an input signal level of 1 Vrms. Further, the rate of change of the electrostatic capacity ($\Delta C/C$., unit: %) under a temperature environment of 150° C., where the capacity-temperature characteristic deteriorated the most in the above temperature range, was calculated and it was judged if the X8R characteristic (−55 to 150° C., $\Delta C/C = \pm 15\%$ or less) was satisfied. If satisfied, "OK" was indicated, while if not satisfied, "NG" was indicated. The results are shown in Table 1.

The high temperature accelerated life (HALT) was evaluated by holding an obtained sample at 200° C. in a state with 10V/μm of DC voltage applied and measuring the average life time. In the examples, the time for the insulation resistance to drop by one order of magnitude from the start of application of the voltage was defined as the "life". This high temperature accelerated life was evaluated for 10 capacitor samples. The The evaluation criteria was 10 hours or more as "good". The results are shown in Table 1.

Examples 2 to 4

Except for changing the calcining conditions so as to change the ratio of the dielectric particles having a domain in the main ingredient phase, the same procedure was performed as in Example 1 to prepare capacitor samples and evaluate their characteristics. The results are shown in Table 1.

Comparative Example 1

Except for changing the calcining conditions so as to make the ratio of the dielectric particles having a domain in the main ingredient phase outside the scope of the present invention, the same procedure was performed as in Example 1 to prepare capacitor samples and evaluate their characteristics. The results are shown in Table 1.

TABLE 1

| Sample No. | Ratio of particles having surface diffusion structure*1 [%] | Ratio of particles having domain in main ingredient phase*2 [%] | Dielectric constant $\in$ | High temp. accelerated life [hr] | Rate of change of capacity (1 V/μm) $\Delta$C/C20[%] 150° C. | X8R |
|---|---|---|---|---|---|---|
| Ex. 1 | 80 | 0 | 1100 | 22.1 | −11.8 | OK |
| Ex. 2 | 80 | 5 | 1210 | 15.1 | −12.7 | OK |
| Ex. 3 | 80 | 10 | 1345 | 14.6 | −13.5 | OK |
| Ex. 4 | 80 | 18 | 1400 | 12.1 | −14.5 | OK |
| Comp. Ex. 1 | 80 | 30 | 1500 | 7.6 | −16.7 | NG |

*1 Ratio of dielectric particles having surface diffusion structure with respect to measured dielectric particles.
*2 Ratio of dielectric particles having domain in main ingredient phase with respect to dielectric particles having surface diffusion structure.

Examples 11 to 14

Except for changing the calcining conditions so as to change the ratio of the dielectric particles having the surface diffusion structure, the same procedure was performed as in Example 1 to prepare capacitor samples and evaluate their characteristics. The results are shown in Table 2.

Comparative Example 2

Except for changing the calcining conditions so as to make the ratio of the dielectric particles having the surface diffusion structure outside the scope of the present invention, the same procedure was performed as in Example 1 to prepare capacitor samples and evaluate their characteristics. The results are shown in Table 2.

TABLE 2

| Sample No. | Ratio of particles having surface diffusion structure*1 [%] | Ratio of particles having domain in main ingredient phase*2 [%] | Dielectric constant ε | High temp. accelerated life [hr] | Rate of change of capacity (1 V/μm) ΔC/C20[%] 150° C. | X8R |
|---|---|---|---|---|---|---|
| Ex. 11 | 65 | 10 | 1370 | 11.1 | −14.1 | OK |
| Ex. 12 | 75 | 10 | 1400 | 15.2 | −13.5 | OK |
| Ex. 13 | 85 | 10 | 1341 | 17.1 | −12.7 | OK |
| Ex. 14 | 95 | 10 | 1300 | 20.7 | −11.1 | OK |
| Comp. Ex. 2 | 50 | 10 | 1310 | 5.2 | −17.0 | NG |

*1 Ratio of dielectric particles having surface diffusion structure with respect to measured dielectric particles.
*2 Ratio of dielectric particles having domain in main ingredient phase with respect to dielectric particles having surface diffusion structure.

As clear from Tables 1 and 2, it could be confirmed that by making the ratio of the dielectric particles having a surface diffusion structure comprised of a main ingredient phase and a diffusion phase and of the dielectric particles having a domain in the main ingredient phase within the range of the present invention, the X8R characteristic can be satisfied and both the capacity-temperature characteristic and the high temperature accelerated life can be realized. Further, by making the ratio of the dielectric particles having a surface diffusion structure comprised of a main ingredient phase and a diffusion phase and of the dielectric particles having a domain in the main ingredient phase within the preferable range of the present invention, it was confirmed that even better results can be obtained.

While the invention has been described with reference to specific embodiments chosen for purpose of illustration, it should be apparent that numerous modifications could be made thereto by those skilled in the art without departing from the basic concept and scope of the invention.

The invention claimed is:

1. A method of production of a dielectric ceramic composition comprised of at least dielectric particles having barium titanate as its main ingredient comprising steps of:

preparing a dielectric material including barium titanate as main ingredient, at least one oxide selected from MgO, CaO, BaO, and SrO as a first sub ingredient, silicon oxide as its main ingredient as a second sub ingredient, at least one oxide selected from $V_2O_5$, $MoO_3$, and $WO_3$ as a third sub ingredient, an oxide of R1 (wherein R1 is at least one element selected from Sc, Er, Tm, Yb, and Lu) as a fourth sub ingredient, $CaZrO_3$ or $CaO+ZrO_2$ as a fifth sub ingredient, an oxide of R2 (wherein R2 is at least one element selected from Y, Dy, Ho, Tb, Gd, and Eu) as a sixth sub ingredient and MnO as a seventh sub ingredient;

dividing said dielectric material into at least two;

calcining the divided dielectric materials under different conditions;

mixing the calcined dielectric materials; and firing the mixed calcined dielectric materials;

wherein the ratio of dielectric particles having a surface diffusion structure including a main ingredient phase comprised of the main ingredient and a diffusion phase present around the main ingredient phase with respect to all of said dielectric particles is 60% or more and the ratio of dielectric particles having a domain in the main ingredient phase with respect to the dielectric particles having the surface diffusion structure is 20% or less.

2. The method of production of dielectric ceramic composition as set forth in claim 1, wherein said dielectric particles include not only the dielectric particles having the surface diffusion structure but also dielectric particles without the surface diffusion structure.

3. The method of production of dielectric ceramic composition as set forth in claim 1, wherein when calculating an average particle size of the dielectric particles forming the dielectric ceramic composition in the form of D50, the ratio of the dielectric particles having the surface diffusion structure is 60% or more with respect to dielectric particles exhibiting the value of the average particle size D50.

4. The method of production of dielectric ceramic composition as set forth in claim 2, wherein when calculating an average particle size of the dielectric particles forming the dielectric ceramic composition in the form of D50, the ratio of the dielectric particles having the surface diffusion structure is 60% or more with respect to dielectric particles exhibiting the value of the average particle size D50.

* * * * *